Jan. 5, 1960 R. L. SANDVIG 2,919,901
DRILL SYSTEM WITH SUCTION
Filed Jan. 25, 1957 2 Sheets-Sheet 1
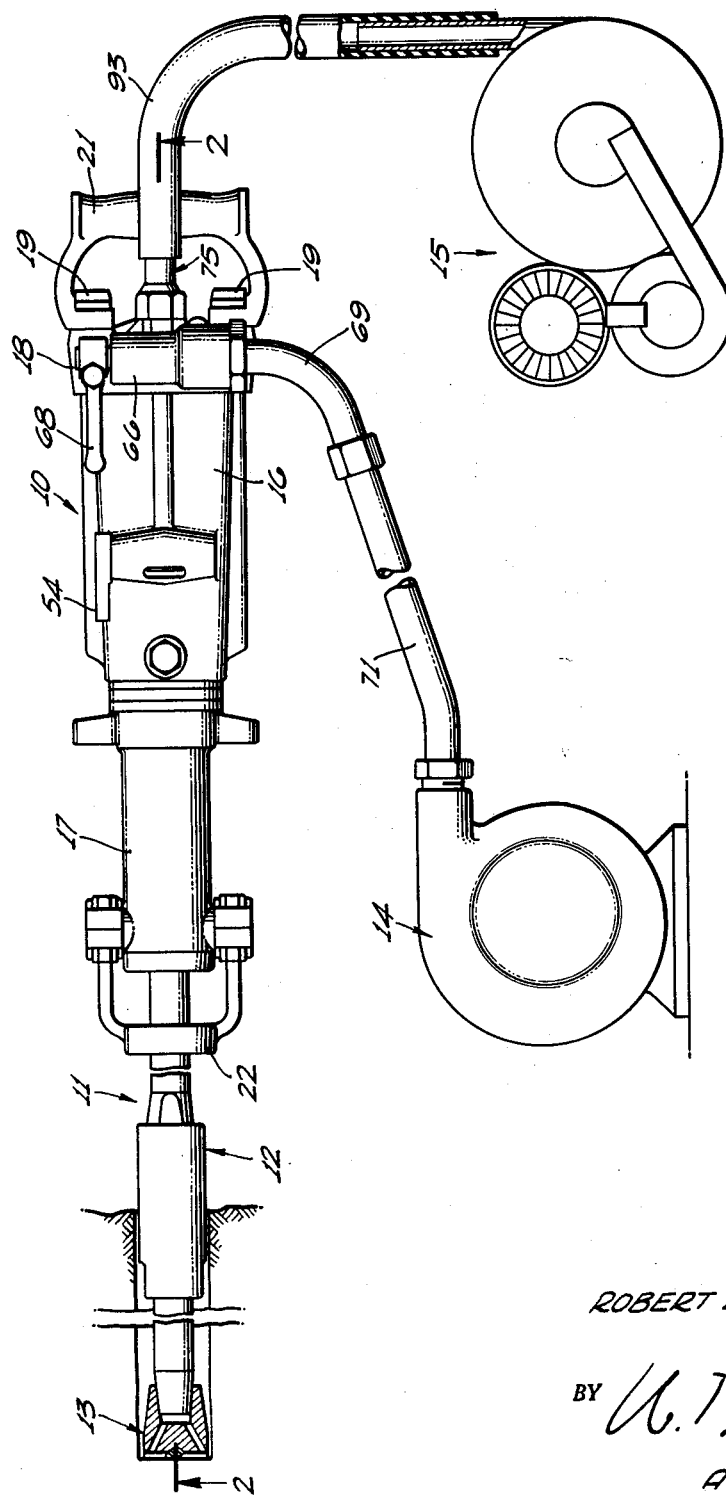
ROBERT L. SANDVIG
INVENTOR.
BY
ATTORNEY Jan. 5, 1960  R. L. SANDVIG  2,919,901
DRILL SYSTEM WITH SUCTION
Filed Jan. 25, 1957  2 Sheets-Sheet 2
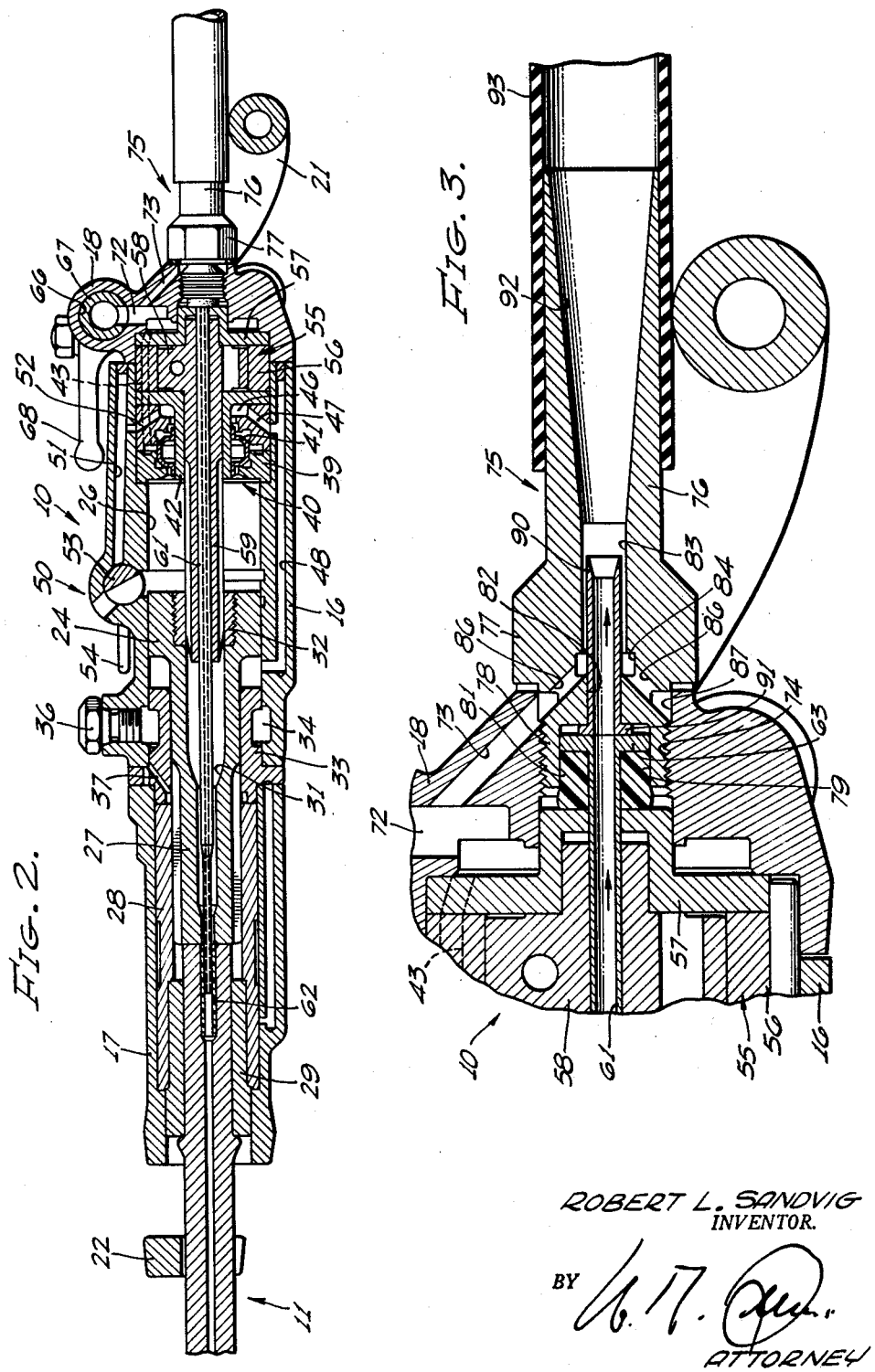
ROBERT L. SANDVIG
INVENTOR.
BY
ATTORNEY

United States Patent Office 2,919,901
Patented Jan. 5, 1960

2,919,901

DRILL SYSTEM WITH SUCTION

Robert L. Sandvig, Whittier, Calif., assignor to Thor Power Tool Company, Aurora, Ill., a corporation of Delaware Application January 25, 1957, Serial No. 636,311

5 Claims. (Cl. 255—50)

The present invention relates to drills in general and particularly to drilling apparatus of the type adapted to drill rock, concrete, and other very hard substances by cutting action, either rotary or percussive, the chips, dust, and grindings being removed by fluid flow through the drilling apparatus itself to a collector. More specifically, the invention comprises improved drilling apparatus in which fluid under pressure is used to actuate the drilling mechanism and also to provide suction to effect an air flow by which foreign material is removed from the hole being drilled through the drilling apparatus and exhausted into a dirt collector.

Rock drills may be either rotary or percussive and the present invention is applicable to both types and to combinations thereof. In a drilling operation—in substances such as rock, concrete, coal—the chips and ground material must be displaced from the hole being bored. If uncontrolled the finer particles including the dust are thrown into the surrounding air and are dangerous to the worker. To prevent the presence of the dust in the ambient air various steps have been taken. In certain forms of drilling apparatus water is directed into the hole being bored directly through the drill and drill stem to the working drill bit. The use of water is subject to several objections and its presence in the tool and in the work is generally to be avoided if possible. Alternatively, air is used but air under pressure directed down through the drill makes its escape exteriorly of the drill steel within the hole and the light foreign material is blown directly into the air. To eliminate this hazard it is necessary to provide additional suction collecting means at the mouth of the hole immediately around the drill steel. These are cumbersome and undesirable.

The drilling apparatus constructed in accordance with the present invention is advantageous in that the use of water is unnecessary and in that the displaced foreign material and dust from the hole, instead of being blown into the surrounding atmosphere, is drawn through the drill steel and exhausted through the drill proper into a dirt-collecting apparatus. The transporting air flow, instead of being provided by suction-creating means auxiliary to the drilling apparatus itself, is created by part of the same air pressure which actuates the drilling apparatus.

It is an object of the present invention to provide a drilling apparatus in which means are provided for displacing cuttings and dust from the working face of the drill bit by air flow directly through the drilling apparatus itself.

It is another object of the present invention to provide a drilling apparatus in which the air under pressure which actuates the drill itself is used to create suction to displace air from the drill bit, to transport cuttings and dust through the drill steel and drill proper, and to exhaust the cuttings and dust into a collecting apparatus.

It is another object of the invention to provide a drill in which pressurized air is used to actuate the connected drill steel and to draw air through that steel and to exhaust it to a collector.

Still another object of the invention is to provide a drilling apparatus in which air under pressure creates a suction to remove cuttings and dust from the drill bit and to transport them through the drill steel and the drilling apparatus and to exhaust them with maximum velocity in a supplemented air flow into a centrifugal separator where they are efficiently separated from the air stream.

Still another object of the invention is the provision of a drilling unit in which the cuttings are ejected in a straight line from the drill bit through the drill unit.

A further object is to provide an air-actuated drill incorporating an air-actuated ejector which creates a suction at the connected drill bit.

Another object is to provide a drilling apparatus in which the flow of actuating air to the drill motor and to the suction-creating means are valve controlled.

A still further object of the invention is to provide an air-actuated drill unit in which a suction-actuated air flow carrying cuttings from the drill stem is supplemented by pressure-actuated air flow to provide increased velocity and volume to transport the cuttings efficiently to a separator.

Another object is to provide an ejector unit connectible to a conventional drilling unit to convert it to a reverse air flow unit in which the air flow is from the drill bit through the tool and to the separator.

These and other more specific objects will appear upon reading the following specification and claims and upon considering in connection therewith the attached drawings to which they relate.

Referring now to the drawings in which a preferred embodiment of the invention is illustrated:

Figure 1 shows a drilling apparatus constructed in accordance with the present invention connected to a source of air under pressure and to a dust-separating unit;

Figure 2 is a longitudinal section through the apparatus shown in Figure 1 upon the line 2—2; and Figure 3 is an enlarged sectional showing of the drill back head and including the suction-creating elements.

Referring again to the drawings in which a preferred embodiment of the invention is illustrated, in Figure 1 the apparatus is seen to comprise a drill proper, indicated generally by the reference character 10, which may be viewed as a conventional rotary percussive type air-actuated drill. The invention does not reside in the particular type of drilling movement or in the specific means by which that movement is provided. Drill 10 is seen to be connected to a centrally bored drill steel, indicated generally by the reference character 11, formed of sections connected by couplings indicated generally by the reference character 12. At the forward end of stem 11 is a drill bit, indicated generally by the reference character 13, formed with interior passages connecting with the bore through the steel 11. The drill bit 13 and coupling 12 are the subject matter of applicant's copending applications Serial No. 618,748, now Patent 2,890,021, and Serial No. 618,749, now abandoned, respectively, filed October 29, 1956.

A blower or compressor unit 14 is shown connected to the drill proper 10 and provides the actuating air under pressure. Also connected to drill 10 is a dust-separating unit 15.

Referring now to the drill unit 10 which is shown in sectional detail in Figures 2 and 3, the drill body is seen to comprise an elongated piston cylinder 16 at one end of which is positioned a front head 17 and at the opposite end of which is located a back head 18. Cylinder 16 and front and back heads 17 and 18 are secured together in longitudinal alignment in a conventional manner by suitable means which include longitudinally extending bolts 19 the heads of which are seen protruding from the back head 18 in Figure 1. A handle 21 connects to the back head 18 and provides means by which the tool can be held and directed while at the opposite end a steel retainer 22 prevents the longitudinal displacement of the steel or drill stem 11.

Within the drill body formed by the casings 16, 17 and 18 are the working parts of the drill proper which are in large part conventional. An elongated piston hammer 24 is positioned for sliding longitudinal displacement within the chamber 26 formed in the casing 16, its shank 27 extending forwardly inside the front head 17 where it engages an elongated chuck driver 28 rotatably mounted within the front head 17. Shank 27 of piston 24 makes sliding engagement with chuck driver 28 through interengaging splines and any rotation of the piston 24 is transmitted to chuck driver 28 and by it directly to the chuck 29 seating the drill steel 11. As is seen in Figure 2, piston 24 is provided with an interior longitudinal bore 31 of varying size which extends its full length and is counterbored at the piston's enlarged end where it interiorly seats a rifle nut 32 in screw threaded relationship. Between the chuck driver 28 and the head of piston 24 there is provided interiorly of piston casing 16 a cylinder front bearing 33 which slidingly supports an enlarged portion of piston shank 27. Bearing 33 is to be understood as forming the forward end of the cylinder 26 and is exteriorly circumferentially grooved in cooperating relationship to the interior surface of the casing 16 to form a channel 34 for a lubricant which may be supplied through a port normally closed by a removable plug 36. An interior passage 37 connects channel 34 with the slidingly engaged surfaces of the piston shank 27 and chuck driver 28 and is available to the parts making sliding contact to reduce friction.

The rearward end of cylinder 26 is closed by a valve unit 40 including a chest 39 and a reciprocable valve element 41 which rides upon a valve guide 42. Chest 39 is interiorly connected by a passage 43 to the interior of back head 18 to receive air under pressure, and depending upon the position of valve element 41, directs that air into the adjacent end of cylinder 26 or into its opposite end through chamber 46 and conduits 47 and 48. An exhaust valve 50 is located centrally of piston cylinder 26, its interior connecting to the cylinder and also to the chamber 46 of valve 40 through passages 51 and 52. The valve element 53 under the control of the handle 54 controls the flow of air from the opposite ends of cylinder 26 to which it is alternately connected as the piston 24 reciprocates. With the valve in its closed position the used air cannot escape and the piston remains inactive.

A piston-rotating unit 55 is located adjacent valve unit 40 and includes a ratchet ring 56 positioned between transverse walls provided at one side by the radial flange of valve guide 42 and at the other side by a centrally cupped plate 57. A rotor element 58 is mounted for step-by-step rotation in valve guide 42 and the central cup in plate 57 and includes an elongated shaft portion 59 which extends through cylinder 26 and is formed exteriorly with inclined ribs or splines which intermesh with cooperating ribs or splines on the interior of rifle nut 32. Unshown ratchet means forming no part of the present invention cooperate with the rotor 58 and the ring 56 to permit the rotor to advance step by step in one direction of rotation under a force received from the piston through the rifle nut 32 but prevent its rotation in the opposite direction. As a result, the interengaging rifling upon the rifle nut 32 and upon the rotor shaft 59 advances the rotor upon the travel of the piston in one direction while the rotor is itself turned as it travels in the opposite direction. The turning of the piston is transmitted to the chuck driver 28 and by that member to the chuck 29 and the connected drill steel whereby the bit 13 is turned relative to the work surface.

The rotor 58 with its elongated shaft portion 59 is centrally bored through its entire length and through the rotor and also through an aligned aperture in adjacent end plate 57 extends a tube 61. Tube 61 extends beyond the rotor 58 and through the central bore 31 of piston 24, its forward end seating sealingly in a Teflon sleeve seal 62 carried in the counterbored end of drill steel 11 in a manner disclosed more fully in applicant's copending application Serial No. 624,552, filed November 27, 1956. At its opposite end beyond the cupped plate 57 tube 61 is formed with a flange or head 63 positioned physically within the back head 18. In a conventional unit a plug carried by the back head would interiorly connect the tube to pressurized air in the back head so that that air would be directed down through the tube and to the drill steel and so to the working bit 13. In the present unit, however, the air flow is reversed as will now be explained.

The back head 18 is conventional and includes a valve chamber 66 seating a rotatable valve element 67 controlled by a manually operable handle 68. Air under pressure enters valve chamber 66 from a connector 69 which conventionally is connected through an elongated flexible hose 71 to the air pump unit 14 as shown in Figure 1. The interior of back head 18 is formed with an air passage 72 to which the passage 43 leading to the valve chest connects and with a second passage 73 which, as shown in Figures 2 and 3, inclines outwardly and inwardly to intercept a centrally located internally threaded seat 74 formed in the back head and into which the aforedescribed tube 61 extends. A removable plug, externally threaded and seated in seat 74 conventionally connects air passage 73 to tube 61 but in the present invention that plug is removed and is replaced by a converter assembly including ejector unit indicated generally by the reference character 75. By replacing the conventional removable plug with the converter assembly of this invention, the pressurized air flowing in passage 73 is employed to suck the drill cuttings through tube 61 for collection in separator 15 rather than to blow the cuttings into the surrounding atmosphere from the drill hole as has been the practice heretofore.

Ejector unit 75 comprises a tube-like body 76 formed centrally with a wrench-engageable exterior surface 77 by which its threaded inner end 78 can be fixed in back head threaded seat 74. The end portion 78 is formed with a seat 79 in which the enlarged head 63 of tube 61 seats, a resilient block 81 providing a seal and a cushion between the head 63 and the adjacent plate 57. An axial passage 82 in body 76 extends from seat 79 and opens into an aligned slightly larger diameter passage 83 through a chamber formed by an encircling channel 84 which is connected by a plurality of ducts 86 with an encircling chamber 87 formed between ejector body 76 and back head 18. Circular chamber 87 connects to the aforementioned back head passage 73 leading to the valve chamber 66. A short tube 90 is carried by the bore 82 of ejector body 76, its headed end 91 clamped between the head 63 of tube 61 and the inner end of seat 79, and its interior forming an aligned continuation of tube 61. Tube 90 extends through chamber 84 and nearly to the end of passage 83 in which it is cenerally spaced to form a surrounding air passage. Beyond tube 90 and forming an extension of bore 83 is a conical expanding passage 92 which extends to the end of body 76 and which opens interiorly to a flexible conduit 93 frictionally seated thereon. It will be recognized that the arrangement provides a suction-creating ejector in which air under pressure exhausted past the end of tube 90 creates a suction effective to draw air therethrough.

The filtering unit 15 may be of conventional design suitable to separate entrained foreign material from a carrying air stream. In a preferred form the unit is of the centrifugal type at least in the first stage supplemented by filtering medium in a later stage. A centrifugal type separator is particularly effective with apparatus constructed in accordance with the present invention for the carrying air stream is of relatively great velocity and volume due to the fact that the original cleaning air under suction is supplemented at the ejector by the pressurized air which created the suction and both pass through the separator.

The operation of the unit constructed in accordance with the invention is as follows. The drill bit 13 is advanced against the work and the valve handle 68 positioned to move valve element 67 to the open position in which pressurized air received from the pump 14 is directed to the valve chest 39 through the passages 72 and 43 and also to the ejector through the passage 72, 73, chamber 87 and ducts 86. The valve element 41 is immediately actuated and air under pressure is alternately fed to the cylinder 26 upon the opposite sides of the piston 24 causing that member to receiprocate at high speed, the expanded gases escaping to the ambient atmosphere through the escape valve 50. The reciprocating piston 24 delivers a hammering blow against the end of the drill steel 11 and also effects the step-by-step rotation of that element as it reciprocates through the cooperation of the rifle nut 32 which it carries with the rifled shank 59 of the rotor 58 which is permitted rotation in only one direction under the control of means the specific construction of which forms no part of the present invention. The step-by-step movement is reflected in the rotational advance of the piston in one direction of travel and is transmitted by it to the drill steel through the chuck driver and chuck 28 and 29, respectively. This action results in effective hammering at the drill bit 13 and produces chips, cuttings and dust which must be removed if drilling efficiency is not to be reduced.

The pressurized air directed to the ejector unit provides the necessary cleaning action. The air under pressure entering the chamber 84 in the ejector body 76 passes at high speed through the passage 83 around the tube 90 and past its end to emerge into the expanding passage 92. Suction is created in tube 90 and is effective through aligned tube 61 to draw air through the drill steel bores to the first of which the bit 13 opens interiorly. The foreign material at the bit 13 is literally carried from the bit face into the bore in the drill steel by the flow of cleaning air which has traveled into the hole around the steel. The air and entrained material travel in a straight line from the bit, through the steel, through the drill proper, and emerge from the ejector still traveling in a straight line and with the air flow supplemented by the high speed pressurized air which has joined the suction air in the expanding passage 92 in the ejector. Air and foreign material are conveyed from the ejector through the hose 93 to the centrifugal separator unit 15 where the foreign material is removed from the air stream with unusual efficiency because of the velocity and volume of the air.

It may be desirable at intervals during operation of the unit to use the pressurized air for cleaning purposes only. To accomplish this result it is only necessary to close the valve 50 so that used air cannot be exhausted thereby stopping the motor. Operation of the entire apparatus is controlled by the back head valve which is positioned by handle 68.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A converter assembly for use in converting a percussive drill tool assembly to use for the removal and collection of drill cuttings by suction rather than by dispersal of the cuttings into the atmosphere by a blast of pressurized air, said assembly comprising an elongated fitting having a venturi passage extending longitudinally therethrough, a threaded shank on the inlet end of said fitting adapted to be screwed into the backhead of a percussive pneumatically-driven tool with said venturi passage aligned with the longitudinal axis of said tool, said threaded shank having an axial bore supporting a tubular member, said tubular member extending axially from said threaded shank toward the opposite end of said fitting in closely spaced relation to the interior walls of said venturi passage and terminating adjacent the throat portion of said venturi passage, the throat portion of said venturi passage and the terminal end of said tubular member being located in assembled position outside the drill tool backhead, annular passage means surrounding said tubular member intermediate the ends thereof and adapted to be supplied with pressurized air from the backhead of a percussive drill tool, the end of said fitting opposite said threaded shank having a long outwardly flaring passage into which pressurized air entering through said throat expands to create a sub-atmospheric suction pressure through said tubular member, said converter assembly being readily adapted for assembly to and disassembly from a percussive drill tool from the exterior of the tool without detachment of the backhead thereof.

2. In a pneumatically operated percussive drill tool of the type having air passage means extending longitudinally therethrough and connecting with a hallow drill steel for the purpose of utilizing pressurized air in part to operate the tool and in part to remove cuttings from the tip area of the drill steel, that improvement which comprises a unitary injector fitting operable by said pressurized air to suck cuttings longitudinally through said drill steel and through said tool for delivery to an air and cuttings separator, said injector fitting having a venturi-shaped passage extending therethrough and a threaded shank end surrounding the inlet to said venturi passage and adapted to seat in a threaded socket therefor centrally of the tool backhead with all portions of the injector fitting other than said threaded shank being located exteriorly of the backhead and adapted to be assembled to and disassembled from said backhead while the latter is operatively assembled to the tool proper, an open-ended tube carried within said threaded shank having its inlet end connected with said air passage means through said tool and its discharge end terminating in the throat of said venturi passage, and an annular chamber surrounding the discharge end of said open-ended tube and arranged to be supplied with pressurized air from within said tool, said pressurized air being effective to create a suction within said first mentioned air passage for the suction removal of drill cuttings and the delivery of the same into said separator, means for supplying pressurized air to said annular chamber and to said percussive drill tool, and control means selectively operable to operate said tool and said cuttings injector simultaneously or said cuttings injector independently of said drill tool.

3. The combination defined in claim 2 characterized in that said air passage means comprises a unitary tube having one end discharging directly into the inlet end of said venturi passage, and its other end having a close sliding fit with the shank end of the drill steel in all operating positions thereof.

4. The combination defined in claim 3 characterized in the provision of a sleeve of low-friction non-metallic resilient material between the air passage in the shank of the drill steel and juxtaposed outer surface of said air passage tube.

5. The combination defined in claim 2 characterized in that said air passage means comprises a unitary tube having a radially flanged outlet end supported within a well opening axially through the shank of said injector fitting, and resilient means surrounding said unitary tube and bearing against said flange to hold the latter pressed firmly against and aligned with the inlet end of said venturi passage.

References Cited in the file of this patent

UNITED STATES PATENTS

| | | |
|---|---|---|
| 651,487 | Leyner | June 12, 1900 |
| 2,101,144 | Lear | Dec. 7, 1937 |
| 2,177,391 | Lear | Oct. 24, 1939 |
| 2,310,265 | Sweeney | Feb. 9, 1943 |
| 2,326,383 | Morrison | Aug. 10, 1943 |
| 2,643,641 | Huffman | June 30, 1953 |

FOREIGN PATENTS

| | | |
|---|---|---|
| 695,009 | Great Britain | July 29, 1953 |